Figure 1:
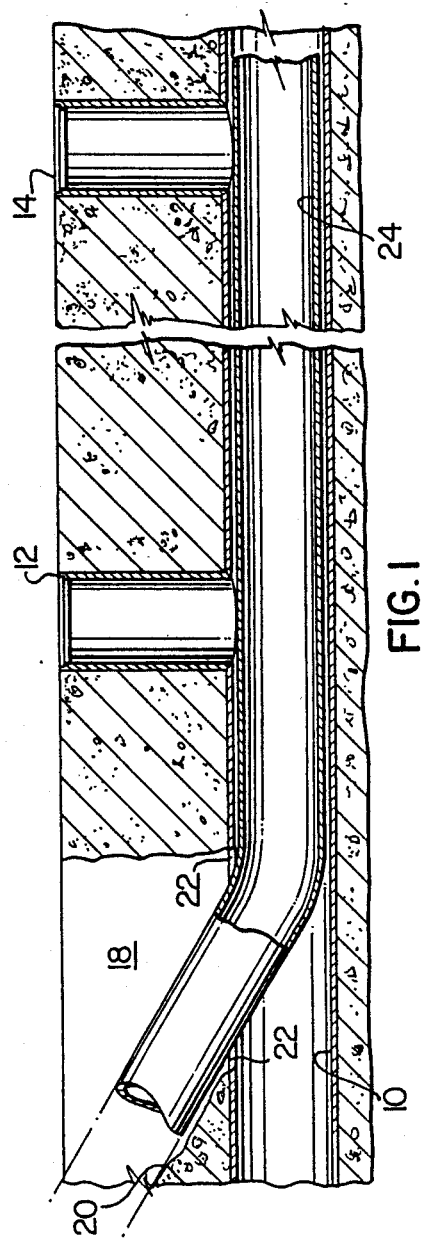

United States Patent [19]

Hahn et al.

[11] Patent Number: 4,956,032

[45] Date of Patent: Sep. 11, 1990

[54] METHOD OF GROUTING USING A VACUUM

[75] Inventors: Paul Hahn; James Allan, both of Collingwood, Canada

[73] Assignee: Keller Industries Ltd., Collingwood, Canada

[21] Appl. No.: 340,494

[22] Filed: Apr. 19, 1989

[30] Foreign Application Priority Data

Apr. 28, 1988 [CA] Canada .................................. 565407

[51] Int. Cl.⁵ ...................... B32B 31/06; B32B 35/00;
E03F 3/06; F16L 55/165
[52] U.S. Cl. .......................................... 156/94; 138/97;
156/294; 264/35; 264/36; 264/101; 264/154;
264/262; 264/516; 264/571; 405/154; 405/155
[58] Field of Search ................ 264/262, 571, 101, 573,
264/35, 512, 516, 36, 154; 405/154, 155, 156;
156/294, 94, 98; 138/97

[56] References Cited

U.S. PATENT DOCUMENTS

| | | | |
|---|---|---|---|
| 1,797,855 | 3/1931 | Conlan | 264/262 X |
| 2,347,855 | 5/1944 | Varga | 264/262 X |
| 2,522,171 | 9/1950 | Furman et al. | 166/277 X |
| 3,495,626 | 2/1970 | Nagel . | |
| 3,662,045 | 5/1972 | Tierling | 264/36 X |
| 3,875,278 | 4/1975 | Brandt | 264/571 X |
| 4,060,953 | 12/1977 | Milne | 264/36 X |
| 4,086,309 | 4/1978 | Alberts | 264/36 X |
| 4,240,995 | 12/1980 | Milne | 264/36 |
| 4,504,171 | 3/1985 | Florence, Jr. | 405/154 |
| 4,619,555 | 10/1986 | Skinner et al. | 405/154 |
| 4,678,370 | 7/1987 | Allen | 405/154 |
| 4,728,223 | 3/1988 | Rice | 405/156 X |
| 4,796,673 | 1/1989 | Ueda | 405/154 X |

FOREIGN PATENT DOCUMENTS

| | | | |
|---|---|---|---|
| 933339 | 9/1973 | Canada . | |
| 1009832 | 5/1977 | Canada . | |
| 1179939 | 12/1984 | Canada . | |
| 1200216 | 2/1986 | Canada . | |
| 1069570 | 6/1976 | Japan | 264/262 |
| 2087322 | 4/1987 | Japan | 264/262 |

*Primary Examiner*—Jan H. Silbaugh
*Assistant Examiner*—Karen D. Kutach
*Attorney, Agent, or Firm*—John A. Baker

[57] ABSTRACT

A method of filling an annular space between inner and outer coaxially arranged pipes while providing the option of maintaining fluid flow through the inner pipe includes optionally establishing fluid flow through the inner pipe; installing first and second seals in the annular space between the two spaced apart pipes at first and second ends of the pipes and inserting one end of a vacuum tube into the annular space through the first seal at the high point in the first seal. A grout tube is inserted into the annular space through the second seal at the high point of the second seal. A vacuum is applied to the second end of the vacuum tube and a grout mixture is applied to an opposite end of the grout tube. A sufficient vacuum is maintained within the annular space for such a time period to draw the grout mixture from the second end to the first end of the pipes to completely fill the annular space.

10 Claims, 1 Drawing Sheet

U.S. Patent

Sep. 11, 1990

4,956,032

METHOD OF GROUTING USING A VACUUM

The present invention relates to a method of installing the grout between a pipe to be repaired and a replacement pipe using a vacuum technique.

Underground pipes, especially sewer pipes wear with time until they are weak or crack, thereby creating the possibility of contaminating the environment through leakage.

It is expensive to replace the entire piping system when it is necessary to solve this problem. It is known to introduce a pipe of a smaller diameter into the old pipe and to use this new, smaller pipe to carry the flow of the sewer or water main. Under such conditions, the section of pipe to be repaired is taken out of service and a pipe of a smaller diameter is inserted into the pipe to be repaired. This smaller pipe is preferably of fairly light weight construction in order for it to be inserted. In this condition it is not strong enough to carry the load of the external hydrostatic water pressure. As a result, it is known to pressurize the smaller pipe in order to strengthen it and then to flow cement grout under pressure into the annular region between the outside surface of the new pipe and the inside surface of the old pipe. It is necessary to pressurize the new pipe so that it holds it's shape during the grouting step which must be done at sufficient pressure to insure that the grout completely fills the annular space between the two pipes. In order to pressurize the inner pipe, the ends are sealed and the pipe is filled with a fluid, for example, air under pressure. This method of grouting the annular space between the pipe precludes the use of the pipe during the repair process. Such sewers can not be blocked for the length of time necessary to do the repair without over-pumping. As a result, an alternate route must be provided to move the fluid being handled by the pipe around the repair site. Such a step in the repair process is costly and in addition adds time to the repair process.

The present invention inserts a relatively thin walled pipe into the sewer or main to be repaired, as in the prior art method just described. Annular seals are then placed around both ends of the pipes, between the pipes. A vacuum line is placed at one end, penetrating the seal at that end and a grout pipe is placed at the other end, also through the seal at that end. The annular space between the pipes is evacuated using a pump connected to the vacuum line. A wet mixture of grout compound is introduced by gravity into the opposite end of the coaxial pipe arrangement via the grout pipe. The vacuum created in the annular space between the pipes causes the grout to fill the annular space. When grout is detected in the vacuum line, the process is stopped and the grout is allowed to set. Because a vacuum is used rather than a pressure to install the grout in the annular space between the two pipes, the inner weaker pipe will not collapse inwardly and so it does not have to be pressurized. It therefore does not have to be sealed and can carry the normal flow of the sewer or main during this procedure. Since the flow of the pipe being repaired is not interrupted, the cost of providing an alternate route for the flow is saved and the repair is carried out faster and with more efficiency.

In accordance with the present invention there is provided a method of filling an annular space between two coaxial pipes, comprising the steps of installing first and second seals in the annular space between two spaced apart coaxial pipes at first and second ends of said coaxial pipes, inserting one end of a vacuum tube into said annular space through said first seal at the high point in said first seal; inserting one end of a grout tube into said annular space through said second seal at the high point of said second seal; applying a vacuum to a second end of said vacuum tube; applying a grout mixture to a second end of said grout tube; and maintaining sufficient vacuum within said annular space for such a time period to draw said grout mixture from said second end to said first end of said coaxial pipes to thereby completely fill said annular space.

In accordance with another aspect of the present invention there is provided a method of repairing a damaged pipe comprising the steps of inserting a repair pipe inside said damaged pipe such that said damaged pipe and said repair pipe form a coaxial pipe section having an annular space therebetween said annular pipe section having a first end and a second end; installing first and second seals in the annular space at said first end and said second end of said coaxial pipe section; inserting one end of a vacuum tube into said annular space through said first seal at the high point in said first seal; inserting one end of a grout tube into said annular space through said second seal at the high point of said second seal; applying a vacuum to a first end of said vacuum tube; applying a grout mixture to a second end of said grout tube; and maintaining sufficient vacuum within said annular space for such a time period to draw said grout mixture from said second end to said first end of said coaxial pipes to thereby completely fill said annular space.

Figure 2:
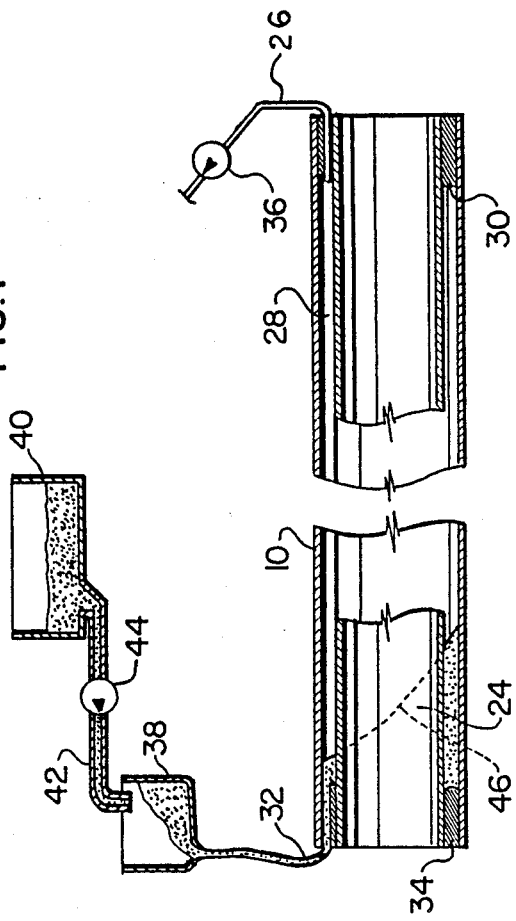

The present invention will be described in detail with the aid of the accompanying drawings, in which FIG. 1 is a schematic diagram of the insertion of a smaller repair pipe into a larger pipe to be repaired; and FIG. 2 is a schematic diagram explaining the method of the present invention.

Referring to FIG. 1, a sewer pipe 10 has two manholes 12 and 14 connected thereto. Pipe 10 is to be lined with a smaller, thinner pipe 24. The pipe 24 can be made of high density polyethylene plastic. The actual material of pipe 24 does not form part of the present invention.

An excavation 18 having a sloping floor 20 is made directly above the pipe 10. A hole 22 is made in the top portion of the pipe 10 and an inner pipe 24 is inserted. It is well known to perform this operation. A cable (not shown) is strung inside pipe 10 to manhole 14. One end of the cable is connected to pipe 24 and the pipe 24 is drawn into the pipe 10. Under normal conditions, manholes are approximately 100 meters apart. The inner pipe may be drawn into the larger pipe 10 over a span of several manholes from a single excavation. Since the inner pipe is fairly light in weight it can bend at the entrance to the larger pipe 10 and can change its direction in accordance with the pipe 10. When the entire pipe 24 is in the pipe 10, the end of the pipe 24 is pulled back to the end of the area to be lined. This is conveniently a manhole which would be off to the left-hand side of FIG. 1. The hole 22 in pipe 10 is then closed and excavation 18 is filled. Such a process of inserting one pipe inside another is known as sliplining.

At the end of the sliplining process, a larger, deteriorated pipe 10 has had a lighter weight pipe 24 inserted therein over a considerable distance from one manhole to another from a single excavation. During the initial stage of getting the smaller pipe started into the larger pipe, a small amount of the flow of the sewer may backup into the excavation. However, once the pull begins, the fluid flow passes down the annular space between the two pipes and the flow is not interrupted. In fact, the fluid flow assists in the lubrication of the pipes and aids the insertion step.

In some instances it is not possible to dig an excavation. This happens in confined areas around buildings where there is insufficient room. Under these conditions, short lengths of the inner pipe are carried down a manhole and inserted into the end of the pipe to be repaired. Each short length of pipe is welded or bonded in some fashion to the length just inserted until the desired length of inner pipe is installed to form a coaxial pipe section suitable for grouting using the vacuum method of the present invention.

Typically, a high density polyethylene pipe is used for the inner pipe 24. If it is a sewer that is being relined the pipe does not have to handle a high pressure and can be of the SDR-32 weight. If a water main is being relined, a heavier pipe 24 is used, namely of a SDR-11 weight. As was mentioned above, each manhole is approximately 100 meters apart and so the grouting step of the process takes place in 100 meter increments. To insure sufficient grouting strength and proper grouting flow, the space between the outside surface of the inner pipe 24 and the inner surface of the outer pipe is typically 25 mm.

FIG. 2 shows a section of pipe repair to be grouted in accordance with the present invention. The ends of pipes 10 and 24 would normally terminate in two manholes. The manholes do not form part of the invention and have been eliminated for the sake of simplicity.

A vacuum tube 26 is inserted into the annular space 28 at one end of the pipe section to be repaired. Vacuum tube 26 is located at the top of the pipe 24 and is held in place by a seal of quick setting grout 30 which forms an annular seal at that end of the pipe.

A grout tube 32 approximately 10 cm in diameter is inserted into the annular space 28 at the opposite end of the pipe section to be repaired, in exactly the same manner as vacuum pipe 26. An annular seal of quick setting grout 34 holds grout tube 32 in place.

Once the seals 30 and 34 have been set in place, the fluid flow of the sewer or main can flow through the interior of the pipe 24 in the normal fashion.

Vacuum pump 36 is connected to vacuum tube 26. Grout tube 32 is connected to a grout hopper 38. A grout mixer 40 mixes the grout and it is delivered to hopper 38 via a grout pipe 42 by an optional pump 44.

Grout mixer 40 is set to mix sand and cement in a typical ratio of 3:1 or 2:1. Fly ash is optionally mixed with the sand and cement to improve the flow of the mix. Water is then added to the mix so that a slump of 200 to 250 mm using a standard slump test is obtained. The grout is then discharged into hopper 38 so that the grout tube 32 is not flooded.

The vacuum pump 36 which is capable of drawing at a rate of 100 liters per minute at a vacuum of 735 mm of mercury is then activated.

When the vacuum operation begins, the vacuum pump 36 will discharge only air. After approximately 45 minutes clear water will begin to be discharged. This is the water that was in the annular space and is being displaced by the grout. After a further 45 minutes the water becomes grey in colour. Approximately 30 minutes thereafter, the discharge will be a thin slurry of water and grout. Once this occurs and the calculated quantity of grout has been introduced into the annular space 28, the grouting process is stopped and the grout is allowed to set. The vacuum and grout tubes can be cut off at a later time. As the grout is fed into the annular space 28 by the gravity pulling on the grout in grout tube 32 and by the suction caused by vacuum pump 36, the grout fills the annular space in approximately the profile shown by dotted line 46. It can be seen, therefore, that as profile line 46 proceeds down the annular space 28, the last place the grout will rest in the annular space is at the vacuum tube 26. When grout material is detected at the output of the pump 36, it is certain that the entire annular space 28 has been filled with grout.

It should be understood that the quantities given in this description have been given by way of example and do not form part of the invention. The size of the pipe to be repaired and the length of the repair will determine many of the parameters given above and it is expected that a person or ordinary skill can dimension these parameters in order to successfully carry out the inventive method.

We claim:

1. A method of filling an annular space between inner and outer coaxially arranged pipes while maintaining fluid flow through said inner pipe, wherein the outer pipe is an existing pipe and said inner pipe is a relatively thin walled pipe, comprising the steps of:
    establishing said fluid flow through said inner pipe;
    installing first and second seals at first and second ends, respectively, of said inner pipe between said inner pipe and said outer pipe to form said annular space;
    inserting a first end of a vacuum tube into said annular space through said first seal at the high point in said first seal;
    inserting a first end of a grout tube into said annular space through said second seal at the high point in said second seal;
    applying a vacuum to a second end of said vacuum tube;
    applying a grout mixture to a second end of said grout tube; and
    maintaining sufficient vacuum within said annular space for such a time period to draw said grout mixture from said second end to said first end of said inner pipe to thereby completely fill said annular space with said grout mixture.

2. The method of claim 1, wherein said second end of said grout tube is connected to a hopper and wherein the method comprises the further step of feeding said grout mixture into said hopper such that said grout tube is filled with a quantity of said grout mixture and air.

3. The method of claim 2, including the further step of preparing said grout mixture by mixing sand and cement together in a ratio of between 2:1 and 3:1 and mixing water with said sand and cement so that the resulting grout mixture has a slump ranging between 200 and 250 mm.

4. The method of claim 3, including the further step of adding fly ash to said grout mixture to improve the flow characteristics of said grout mixture while maintaining a slump ranging between 200 and 250 mm.

5. A method of repairing a damaged pipe so that fluid flow through a portion of the interior of the pipe is maintained during a portion of the method, the method comprising the steps of:
    inserting a relatively thin walled repair pipe inside said damaged pipe such that said damaged pipe and said repair pipe form a coaxial pipe section having an annular space therebetween, said coaxial pipe section having a first end and a second end;

establishing said fluid flow through said repair pipe;

installing first and second seals at said first end and said second end, respectively, of said coaxial pipe section to form said annular space;

inserting a first end of a vacuum tube into said annular space through said first seal at the high point in said first seal;

inserting a first end of a grout tube into said annular space through said second seal at the high point in said second seal;

applying a vacuum to a second end of said vacuum tube; and maintaining sufficient vacuum within said annular space for such a time period to draw said grout mixture from said second end to said first end of said coaxial pipe section to thereby completely fill said annular space with said grout mixture.

6. The method of claim 5, wherein said second end of said grout tube is connected to a hopper and wherein the method comprises the further step of feeding said grout mixture into said hopper such that said grout tube is filled with a quantity of said grout mixture and air.

7. The method of claim 6, including the further step of preparing said grout mixture by mixing sand and cement together in a ratio of between 2:1 and 3:1 and mixing water with said sand and cement so that the resulting grout mixture has a slump ranging between 200 and 250 mm.

8. The method of claim 7, including the further step of adding fly ash to said grout mixture to improve the flow characteristics of said grout mixture while maintaining a slump ranging between 200 and 250 mm.

9. The method of claim 5, wherein the step of inserting said repair pipe into said damage pipe comprises the steps of:

excavating a hole at one end of said damaged pipe;

making a hole in the top of said damaged pipe at the location of said excavation;

providing a length of repair pipe of sufficient length to provide said coaxial pipe section; and inserting said length of repair pipe into said damaged pipe through said hole.

10. The method of claim 5, wherein the step of inserting said repair pipe into said damaged pipe comprises the steps of:

providing a plurality of short lengths of repair pipe at one end of said damaged pipe;

inserting a said plurality of said short lengths of repair pipe into said one end of said damaged pipe;

bonding one end of each adjacent short length of repair pipe to its adjacent pipe as it is inserted said damaged pipe until a sufficient length of repair pipe has been inserted into said damaged pipe to provide said coaxial pipe section.

* * * * *